Patented Mar. 31, 1931

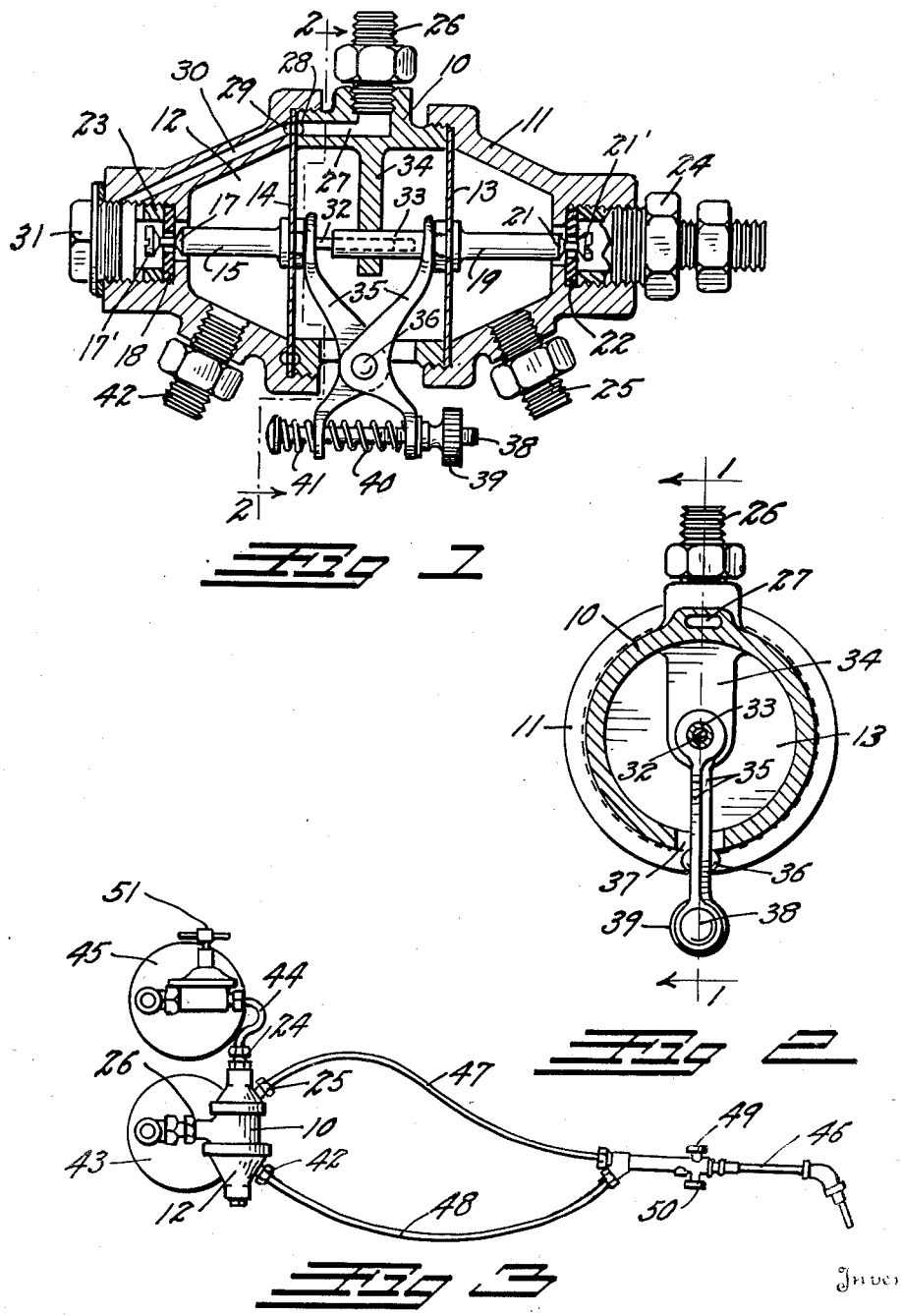

1,798,317

UNITED STATES PATENT OFFICE

BRUCE M. EATON, OF DOUGLAS, KANSAS

PROPORTIONING REGULATOR FOR OXYACETYLENE WELDERS

Application filed March 24, 1930. Serial No. 438,489.

This invention relates to a combined regulating and proportioning valve for the gas supplies to an oxy-acetylene torch and has for its principal object the provision of a simple and highly efficient valve mechanism which will definitely proportion the flow of the two gases to each other; which, when one gas supply fails, will automatically cut off the other; which will reduce the pressure of the supply in both gas lines to any desired degree; and which will shut off both gases in case of an unusually high pressure in either or in case the pressure of either gas supply fails or becomes lower than the pressure demanded by the operator.

A further object is to so construct the valve that it will be impossible for an operator to render the proportioning feature useless by attempting to so tighten the spring as to keep the supply valves open at all times.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:—

Fig. 1 is a longitudinal section through the improved, combined regulating and proportioning valve, taken on the line 1—1, Fig. 2.

Fig. 2 is a cross section through the valve taken on the line 2—2, Fig. 1.

Fig. 3 is a detail view illustrating the hookup of the valve in an oxy-acetylene torch system.

This invention is particularly designed as an improvement over the proportioning valve shown in applicant's co-pending application Serial #424,831.

The invention comprises a cylindrical atmospheric chamber 10. An oxygen chamber 11 is secured to one side of the atmospheric chamber 10 and an acetylene chamber 12 is secured to the other side thereof. An oxygen diaphragm 13 separates the atmospheric chamber 10 from the oxygen chamber 11, and an acetylene diaphragm 14 separates the acetylene chamber 12 therefrom. The diaphragms 13 and 14 may be clamped in place between the chambers, as illustrated in Fig. 1.

An acetylene valve stem 15 projects from the outer face of the acetylene diaphragm 14. The valve stem 15 carries two valve faces 17 and 17' which act to close opposite sides of a valve passage formed in a valve washer 18. An oxygen valve stem 19 projects from the outer face of the oxygen diaphragm 13. It also carries two valve faces 21 and 21', which act to close opposite faces of a passage in a second valve washer 22. The valve washer 18 is locked in place by means of an annular clamp nut 23. The valve washer 22 is locked in place by means of a nipple 24.

Oxygen is fed to the oxygen chamber 11 through the nipple 24 and discharges therefrom through an oxygen discharge nipple 25. Acetylene is fed to the device through an acetylene nipple 26 which communicates with a passage 27 in the wall of the atmospheric chamber 10. The passage 27 communicates with an annular groove 28 against one face of the diaphragm 14. Suitable openings are provided through the diagram 14 to allow the acetylene to reach a second annular groove 29 in the face of the acetylene chamber 12. A second passage 30 communicates through the wall of the acetylene chamber 12 with the outer face of the valve washer 18. Access may be had to the valve washer 18 by removing a threaded cap 31. Acetylene discharges from the acetylene chamber 12 through an acetylene discharge nipple 42.

A guide rod 32 projects inwardly from the acetylene valve stem 15 and slides within a guide sleeve 33 which in turn projects inwardly from the oxygen valve stem 19. The guide sleeve 33 may be slidably supported in a bracket 34 within the atmospheric chamber 10. This construction rigidly aligns the valve stems with their respective valve passages in the washers 18 and 22.

A pair of tong arms 35, pivoted together at 36, are fitted over the valve stem projections within the atmospheric chamber 10. These arms project through a slotted opening 37 in the wall of the atmospheric chamber and terminate about an adjusting screw 38 on the exterior. The tong arms 35 can be caused to separate within the atmospheric chamber 10 by tightening an adjusting nut 39, upon bolt 38.

They are constantly urged towards each other within the chamber 10 by means of a compression spring 40 which surrounds the adjusting bolt 38. A second relatively heavy regulating spring 41 is positioned between the head of the bolt 38 and one of the tong arms 35.

In Fig. 3 a typical welding torch is indicated at 46, its oxygen hose at 47 and its acetylene hose at 48. The oxygen valve of the torch is indicated at 49 and the acetylene valve at 50. An acetylene bottle is indicated at 43 and an oxygen bottle at 45 with its pressure reducing valve at 51. The entire device is designed to be secured upon the acetylene bottle 43 by means of the nipple 26. An oxygen pipe 44 is then extended from the oxygen nipple 24 to the reducing valve 51 on the oxygen bottle 45. The oxygen hose 47 of the torch 46 is secured to the oxygen discharge nipple 25. The acetylene hose 48 of the torch is secured to the acetylene discharge nipple 42 and the device is ready for use.

The reducing valve 51 need not be minutely adjusted since it only serves to reduce the extreme pressure of the oxygen bottle to a degree safe to handle. The minute adjusting is done by the valve of the present invention.

The pressure delivered to the torch is reguluated by means of the adjusting nut 39. When this nut is tightened it increses the resistance of the reguluating spring 41 and makes it more difficult for the gas pressures in the chambers 11 and 12 to force the diaphragms inwardly and thus allows a higher pressure to build up in the chambers than when the nut 39 is loosened. The resistance of the spring 41 is therefore the feature which determines the regulating or the pressure delivered to the torch.

The proportioning feature is accomplished by the movement of the tongs to the right or left when the differential pressure varies between the chambers 11 and 12. Thus, should the pressure drop in the chamber 12, owing to the operator's opening his acetylene valve 50, it will allow the oxygen in chamber 11 to force the tongs to the left, thereby opening the outer acetylene valve face 17' to admit additional acetylene to bring the pressure in the chamber 12 to its normal proportion. The opposite action will take place should the oxygen pressure drop in the chamber 11.

Should the regulating valve 51 accidentally allow an exceedingly high pressure to build up in the chamber 11, the entire structure will be forced to the left to first close the inner acetylene valve face 17 and stop the supply of acetylene. Further movement will compress the cushion spring 41 and close the outer oxygen valve face 21' so as to shut off the supply of both gases before damage can be done.

Should the pressure in either bottle 43 or 45 fall below the amount necessary to supply the demand to which the operator has set the regulating spring 41, it will allow the spring 41 to expand and immediately close the inner valve face of that gas. This will relieve the resistance on the outer gases diaphragm and allow it to be forced inwardly until its outer valve face is closed. Thus both gases will be immediately shut off should the pressure of either fail.

One of the objects of the double action valves 17, 17', 21, 21', is to prevent the operator from discarding the proportioning effect of the proportioning regulator. If it was not for the double faced valves the operator could tighten the tension on the spring 41 tight enough to hold the valve on the side of the regulator that has the least pressure open at all times. This would destroy the proportioning action of the valve. With double faced valves, however, any undue tightening of the nut 39 will close the inner valve faces. He, therefore, must keep the proportioning feature working and forced at all times to keep the pressures in the supply tanks higher than the pressure he demands, (regulated by the compression of the spring 41), on the discharge side of the proportioning regulator.

Should either of the diaphragms break, gas will be carried off through the atmospheric chamber 10 and the opening 37 without admixing with the other gas.

The device has been described as though acetylene were admitted through the nipple 26 and oxygen through the nipple 24. It would operate equally well with the oxygen admitted through the nipple 26 and the acetylene through the nipple 24.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. A combined proportioning and regulating valve comprising: an atmospheric chamber; a first gas chamber at one side thereof; a second gas chamber at the other side thereof; a first diaphragm separating said first gas chamber from said atmospheric chamber; and a second diaphragm separating said second gas chamber from said atmospheric chamber; means for operating a first valve from the movement of said first diaphragm; means for operating a second valve from the movement of said second diaphragm; manually operated means for adjusting the relation between said two valve operating means; said means comprising: an adjusting nut arranged when turned in one direction to cause a separation of said diaphragms and when turned in the other direction to allow said diaphragms to approach each other.

2. A combined proportioning and regulating valve comprising: an atmospheric chamber; a first gas chamber at one side thereof; a second gas chamber at the other side thereof; a first diaphragm separating said first gas chamber from said atmospheric chamber; a second diaphragm separating said second gas chamber from said atmospheric chamber; means for operating a first valve from the movement of said first diaphragm; means for operating a second valve from the movement of said second diaphragm; manually operated means for adjusting the relation between said two valve operating means; said means comprising: an adjusting nut arranged when turned in one direction to cause a separation of said diaphragms and when turned in the other direction to allow said diaphragms to approach each other; and spring means acting to constantly oppose the action of said nut.

3. A combined proportioning and regulating valve comprising: an atmospheric chamber; a first gas chamber at one side thereof; a second gas chamber at the other side thereof; a first diaphragm separating said first gas chamber from said atmospheric chamber; a second diaphragm separating said second gas chamber from said atmospheric chamber; means for operating a first valve from the movement of said first diaphragm; means for operating a second valve from the movement of said second diaphragm; manually operated means for adjusting the relation between said two valve operating means, said means comprising: an adjusting nut arranged when turned in one direction to cause a separation of said diaphragms and when turned in the other direction to allow said diaphragms to approach each other; spring means acting to constantly oppose the action of said nut; and a second spring means arranged to allow movement of one of said diaphragms after the other diaphragm has reached its extreme position.

4. A regulating valve for two gas supplies comprising: a first gas chamber; a second gas chamber; there being gas supply and gas discharge passages to and from each of said chambers; an atmospheric chamber separating said two gas chambers; diaphragms separating each of said gas chambers from said atmospheric chamber; valve stems extending oppositely outward from each of said diaphragms; valve faces carried by said stems and adapted to close said supply passages as said diaphragms move toward said atmospheric chamber; resilient means for resisting said latter movement; manually operable means for varying the resistance of said resilient means; and an adjustable connection between said diaphragms so as to communicate the movements of one to the other.

5. A regulating valve for two gas supplies comprising: a first gas chamber; a second gas chamber; there being gas supply and gas discharge passages to and from each of said chambers; an atmospheric chamber separating said two gas chambers; diaphragms separating each of said gas chambers from said atmospheric chamber; valve stems extending oppositely outward from each of said diaphragms; valve faces carried by said stems and adapted to close said supply passages as said diaphragms move toward said atmospheric chamber; resilient means for resisting said latter movement; manually operable means for varying the resistance of said resilient means; and an adjustable connection between said diaphragms so as to communicate the movements of one to the other, said resilient means being carried by said adjustable connection.

6. A regulating valve for two gas supplies comprising: a first gas chamber; a second gas chamber, there being gas supply and gas discharge passages to and from each of said chambers; an atmospheric chamber separating said two gas chambers; diaphragms separating each of said gas chambers from said atmospheric chamber; valve stems extending oppositely outward from each of said diaphragms; valve faces carried by said stems and adapted to close said supply passages as said diaphragms move toward said atmospheric chamber; tong members pivoted together and adapted to extend into said atmospheric chamber with their inner extremities acting against said diaphragms; and manually operated means for causing said tong members to act to force said diaphragms away from each other.

7. A regulating valve for two gas supplies comprising: a first gas chamber; a second gas chamber, there being gas supply and gas discharge passages to and from each of said chambers; an atmospheric chamber separating said two gas chambers; diaphragms separating each of said gas chambers from said atmospheric chamber; valve stems extending oppositely outward from each of said diaphragms; valve faces carried by said stems and adapted to close said supply passages as said diaphragms move toward said atmospheric chamber; tong members pivoted together and adapted to extend into said atmospheric chamber with their inner extremities acting against said diaphragms; a spring arranged to separate said tong members so as to urge said diaphragms away from each other; and manually adjusted means for adjusting the action of said spring.

8. A regulating valve for two gas supplies comprising: a first gas chamber; a second gas chamber, there being gas supply and gas discharge passages to and from each of said chambers; an atmospheric chamber separating said two gas chambers; diaphgrams separating each of said gas chambers from said atmospheric chamber; valve stems extending oppositely outward from each of said diaphragms; valve faces carried by said stems and adapted to close said supply passages as said diaphragms move toward said atmospheric chamber; tong members pivoted together and adapted to extend into said atmospheric chamber with their inner extremities acting against said diaphragms; manually operated means for causing said tong members to act to force said diaphragms away from each other, said tong members being free to move in either direction as a whole so as to communicate the movements of one diaphragm to the other.

9. A regulating valve for two gas supplies comprising: a first gas chamber; a second gas chamber, there being gas supply and gas discharge passages to and from each of said chambers; an atmospheric chamber separating said two gas chambers; diaphragms separating each of said gas chambers from said atmospheric chamber; valve stems extending oppositely outward from each of said diaphragms; valve faces carried by said stems and adapted to close said supply passages as said diaphragms move toward said atmospheric chamber; and resilient means for resisting said latter movement; a guide rod projecting into said atmospheric chamber from one of said diaphragms; and a guide sleeve projecting into said atmospheric chamber from the other of said diaphragms, said sleeve surrounding said rod so as to guide said valve stems in said passages.

10. A regulating valve for two gas supplies comprising: a first gas chamber; a second gas chamber, there being gas supply and gas discharge passages to and from each of said chambers; an atmospheric chamber separating said two gas chambers; diaphragms separating each of said gas chambers from said atmospheric chamber; valve stems extending oppositely outward from each of said diaphragms; valve faces carried by said stems and adapted to close said supply passages, as said diaphragms move toward said atmospheric chamber; resilient means for resisting said latter movement; and other valve faces carried by said stems and adapted to close the supply passage to each gas chamber as the diaphragm of that chamber moves away from said atmospheric chamber.

In testimony whereof, I affix my signature.

BRUCE M. EATON.